United States Patent
Viswanathan et al.

(10) Patent No.: US 8,665,744 B2
(45) Date of Patent: Mar. 4, 2014

(54) CONVENIENT PROVISIONING OF EMBEDDED DEVICES WITH WIFI CAPABILITY

(75) Inventors: Prashant Viswanathan, Bangalore (IN); Greg Winner, Orange, CA (US); Pankaj Vyas, Bangalore (IN)

(73) Assignee: Gainspan Corporation, San Jose, CA (US)

( * ) Notice: Subject to any disclaimer, the term of this patent is extended or adjusted under 35 U.S.C. 154(b) by 49 days.

(21) Appl. No.: 13/474,741

(22) Filed: May 18, 2012

(65) Prior Publication Data

US 2013/0308493 A1  Nov. 21, 2013

(51) Int. Cl.
*H04L 12/28* (2006.01)
(52) U.S. Cl.
USPC .................. 370/252; 370/401; 370/464
(58) Field of Classification Search
USPC .......... 370/252, 328, 338, 400, 401, 431, 370/463–465, 468; 455/550.1, 561, 562.1
See application file for complete search history.

(56) References Cited

U.S. PATENT DOCUMENTS

| | | | |
|---|---|---|---|
| 7,826,833 B2 | 11/2010 | Madhavan et al. | |
| 7,929,504 B2 * | 4/2011 | Wentink et al. | 370/338 |
| 7,949,358 B2 * | 5/2011 | Wentink et al. | 455/515 |
| 2008/0225805 A1 | 9/2008 | Pearson et al. | |
| 2009/0156209 A1 * | 6/2009 | Franklin et al. | 455/435.2 |
| 2010/0080202 A1 | 4/2010 | Hanson | |
| 2010/0165879 A1 | 7/2010 | Gupta et al. | |
| 2010/0313262 A1 | 12/2010 | Mehta et al. | |
| 2011/0014898 A1 | 1/2011 | Doyle | |
| 2011/0289493 A1 * | 11/2011 | Keefe et al. | 717/168 |
| 2013/0193203 A1 * | 8/2013 | Larson et al. | 235/375 |

OTHER PUBLICATIONS

Prof. Dr. Rer. Nat. Otto Spaniol, "Instant Networking and Dynamic Service Discovey", Seminar: Ubiquitos Computing, Year WS 2005/2006, pp. 1-26.
Yokohama, "ReZolt® Launches Em-FiTM Embedded Wi-Fi Platform", ReZolt Corporation, Dated :Oct. 24, 2011, pp. 1-2.
"ReZoltTM Em-FiTM Embedded Wi-Fi Platform Overview", http://www.rezolt.com/attachments/article/11/ReZolt%20EmFi%20Platform%20Overview%2011012%-20Letter.pdf , Downloaded Circa Mar. 7, 2012, p. 1-4.
Larry M. Sanders, "A Configuration Protocol for Embedded Devices on Secure Wireless Networks", B.S.Co.E., University of Kansas, Lawrence, Kansas, Year 2000, p. 1-91.
"Devicescape for Hardware Companies", http://www.devicescape.com/offload-service/for-manufacturers,Copyright year 2012, Devicescape Software, Inc, p. 1-2.
"Provisioning XML Document for Wi-Fi Configuration Service Provider (Windows Embedded Compact 7)" http://msdn.microsoft.com/en-us/library/gg155011.aspx, Downloaded Circa Mar. 7, 2012, p. 1-4.

* cited by examiner

Primary Examiner — Kerri Rose
(74) Attorney, Agent, or Firm — Narendra Reddy Thappeta

(57) ABSTRACT

A WiFi-enabled embedded device boots as a first access point. The WiFi-enabled embedded device communicates with a first wireless station to receive configuration parameters while continuing to operate as an access point. The WiFi-enabled embedded device then applies the configuration parameters internally to cause the WiFi-enabled embedded device to operate as a second wireless station. In an embodiment, the first wireless station discovers a configuration service advertized by the WiFi-enabled embedded device using mDN/DNS-SD, and automatically provides the configuration parameters to the WiFi-enabled embedded device. Convenient provisioning of the WiFi-enabled embedded device is thus made possible.

20 Claims, 3 Drawing Sheets

CONVENIENT PROVISIONING OF EMBEDDED DEVICES WITH WIFI CAPABILITY

BACKGROUND

1. Technical Field

Embodiments of the present disclosure relate generally to WiFi-enabled embedded devices, and more specifically to techniques for convenient provisioning of embedded devices with WiFi[™] capability.

2. Related Art

Embedded devices refer to devices which operate with minimal processing and/or memory capabilities to the point they generally have minimal user interfaces (e.g., LEDs and switches, but not support for much bigger displays such as monitors or graphical user interfaces), as is well known in the relevant arts. Embedded devices find use in a broad range of electronic environments such as consumer electronics (refrigerators, lighting equipment, televisions, printers, etc.), automotives (e.g., cars) and industrial electronics.

WiFi[™] capability is often provided integral to such embedded devices. Such capability implies that the device is provided with the necessary hardware and software to operate in accordance with IEEE 802.11 standards. Such capability is generally important since the resulting communication can form the basis for various tasks such as data acquisition, management applications, maintenance scheduling, etc.

However, embedded devices need to be provisioned before such WiFi[™] capability is usable. Provisioning entails various configurations such that the embedded device can thereafter communicate with other desired devices on the network.

BRIEF DESCRIPTION OF THE VIEWS OF DRAWINGS

Example embodiments of the present invention will be described with reference to the accompanying drawings briefly described below.

The drawing in which an element first appears is indicated by the leftmost digit(s) in the corresponding reference number.

DETAILED DESCRIPTION

1. Overview

An aspect of the present invention enables convenient provisioning of WiFi-enabled embedded devices. A WiFi-enabled embedded device boots as a first access point. The WiFi-enabled embedded device communicates with a first wireless station to receive configuration parameters while continuing to operate as an access point. The WiFi-enabled embedded device then applies the configuration parameters internally to thereafter operate as a second wireless station.

According to another aspect, the first wireless station discovers a configuration service advertized by the WiFi-enabled embedded device using mDN/DNS-SD, and automatically provides the configuration parameters to the WiFi-enabled embedded device.

According to yet another aspect, the WiFi enabled device provides a service based on HTTP, using which the first wireless station communicates with the WiFi-enabled embedded device, and automates several aspects of the provisioning.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
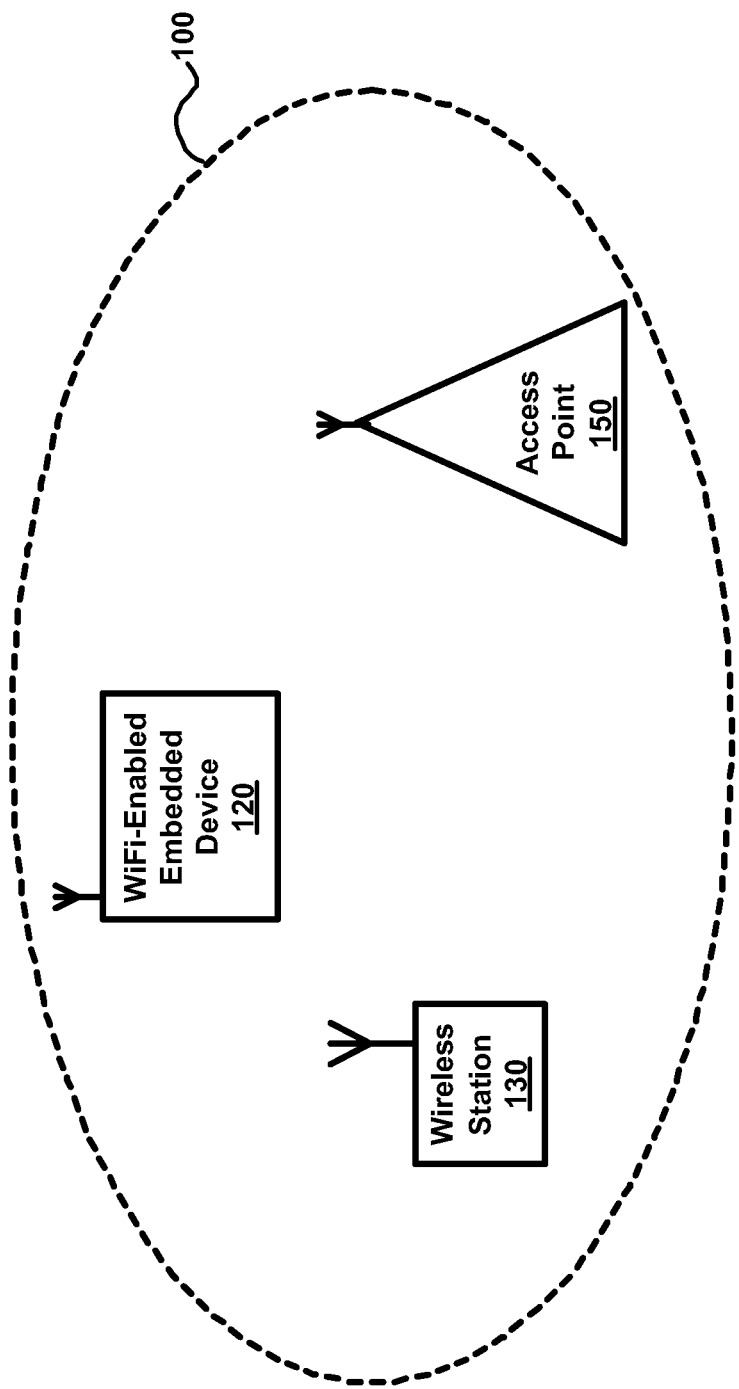
FIG. 1 is a block diagram of an example environment in which several features of the present invention can be implemented.

FIG. 1 is a block diagram of an example environment in which several features of the present invention can be implemented. WLAN 100 is shown containing WiFi-enabled embedded device 120, wireless station 130 and access point (AP) 150. WLAN 100 represents an infrastructure basic service set (infrastructure BSS) according to the 802.11 standards. Merely for illustration, only representative devices are shown contained in WLAN 100, and typically many more devices (wireless stations as well as access points) may be present in WLAN 100.

Wireless station 130 is designed to operate according to the specifications of a 'wireless station' or 'client' in an IEEE 802.11 WLAN standards. Access point 150 operates as a switch providing connectivity between various wireless stations. Access point 150 may be provided with connectivity to external networks (not shown) also, such that the wireless stations are provided connectivity to systems on such networks as well. Access point 150 operates in accordance with IEEE 802.11 WLAN standards.

WiFi-enabled embedded device 120 represents an embedded device which has wireless communication capability according to IEEE 802.11 standards, and which may have minimal or no user interface. As an example, WiFi-enabled embedded device 120 may be a pressure sensor that records pressure measurements of a corresponding physical quantity. It may be desired to transmit the pressure measurements to AP 150, which may either process the measurements or forward the measurements to another device (either within or external to WLAN 100) that may process the measurements. Other examples include microwave oven, smart plug, etc.

However, the minimal or no user-interface (e.g., in the form of display, keypad/buttons, etc) in WiFi-enabled embedded device 120 may pose a problem for its provisioning. Alternatively, even if such user-interface were present, WiFi-enabled embedded device 120 may be physically located in a place that may be difficult to access for manual configuration.

Due to the minimal (or no) user-interface, provisioning of WiFi-enabled embedded device 120 may be difficult or cumbersome. Provisioning (or configuration) refers to configuration of various parameters such as, an identifier of a network (i.e., access point) WiFi-enabled embedded device 120 should associate with, any authentication information to be used prior to such association, and any other information as deemed convenient/necessary for providing Wi-Fi connectivity to device 120.

Several aspects of the present invention enable WiFi-enabled embedded device 120 to be provisioned wirelessly through a wireless station (wireless station 130 in the example of FIG. 1), as described next.

3. Provisioning a WiFi-Enabled Embedded Device

Figure 2:
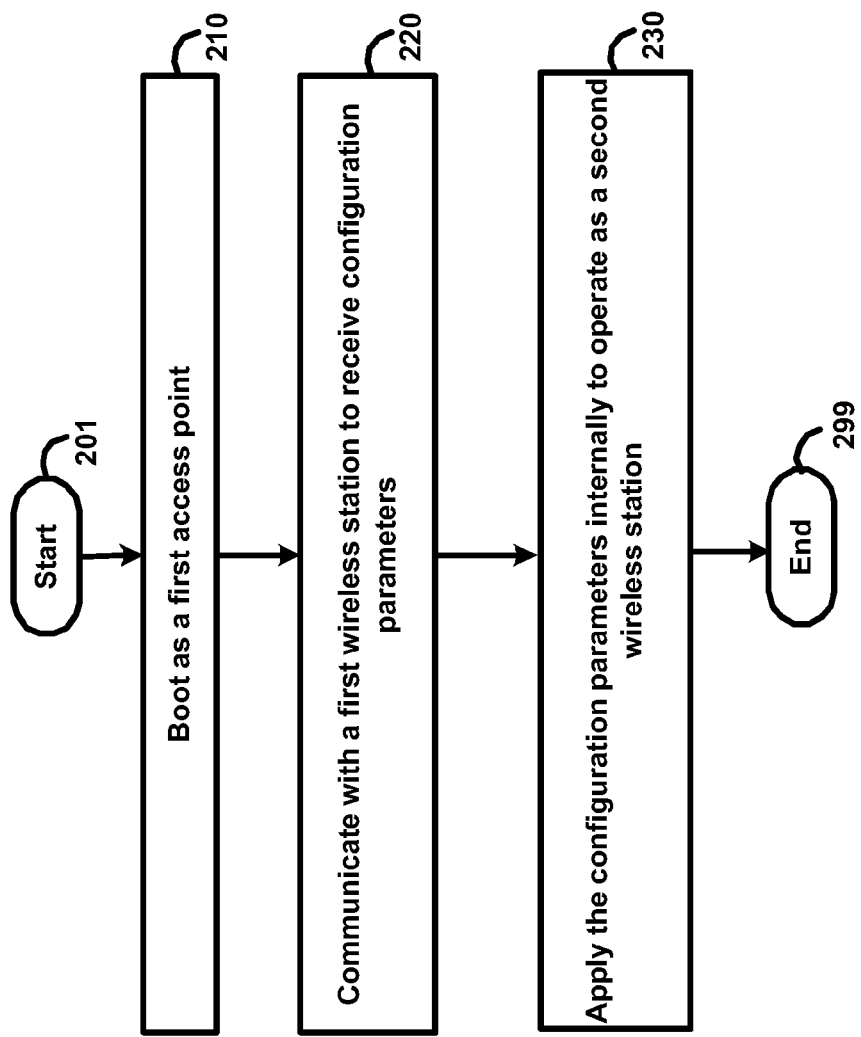
FIG. 2 is a flowchart illustrating the manner in which a WiFi-enabled embedded device is provisioned, in an embodiment of the present invention.

FIG. 2 is a flowchart illustrating the manner in which a WiFi-enabled embedded device is provisioned, in an embodiment. The flowchart is described with respect to the devices of FIG. 1 merely for illustration. However, various features described herein can be implemented in other environments and using other components as well, as will be apparent to one skilled in the relevant arts by reading the disclosure provided herein.

Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, WiFi-enabled embedded device 120 boots as a first access point. As is well known in the relevant arts, booting refers to the operation(s) of loading and executing a set of modules (or routines) upon powering-on of the device, without requiring user intervention, etc. Thus, to boot as an access point, the set of modules that are executed needs to include those instructions that enable device 120 to thereafter operate as an access point (AP) as defined by the IEEE 802.11 standards. Accordingly, after being powered on, WiFi-enabled embedded device 120 performs operation of an AP, such as, for example, one or more of, transmission of beacons, responding to probe request messages, etc. Booting as an AP enables wireless stations such as wireless station 130 to associate with WiFi-enabled embedded device 120 and thereafter configure WiFi-enabled embedded device 120, as described below. Control then passes to step 220.

In step 220, WiFi-enabled embedded device 120 communicates with wireless station 130 to receive configuration parameters. Communication entails exchange of data packets. In an embodiment described below, such communication occurs on initiation by wireless station 130. Wireless station 130 associates with WiFi-enabled embedded device 120 (now operating as an AP) according to the specifications of the IEEE 802.11 standards. WiFi-enabled embedded device 120 continues to operate as an AP while receiving the configuration parameters from wireless station 130. The configuration parameters include the SSID of a target AP to which WiFi-enabled embedded device 120 is to associate with, as well as any authentication information (e.g., passwords) required prior to such association.

SSID and authentication information is merely representative. However, the configuration parameters can also include other parameters related to other layers of the networking stack, as t may be required for the device to establish IP connectivity when it changes state to operate as a second wireless station as described in step 230. The data exchanged between WiFi-enabled embedded device 120 and wireless station 130 during the communication of step 220 may be encrypted (for example according to secure socket layers/SSL technology). The key(s) required for deciphering the communication may be stored a priori in WiFi-enabled embedded device 120 and wireless station 130. Control then passes to step 230.

In step 230, WiFi-enabled embedded device 120 applies the configuration parameters internally, to cause WiFi-enabled embedded device 120 to operate as a second wireless station. 'Application of the configuration parameters' refers to storing of the values of the configuration parameters in appropriate locations, and performing any other necessary operation, to thereafter enable device 120 to associate with another (desired/target) AP while operating as a wireless station (second wireless station) according to IEEE 802.11 standards.

Thus, assuming the configuration information specifies AP 150 as the target AP, WiFi-enabled embedded device 120 assumes the role of a wireless station according to IEEE 802.11, and may scan the radio channels specified for WLAN operation by IEEE 802.11 for beacons transmitted from AP 150. Subsequent to receipt of such a beacon, WiFi-enabled embedded device 120 associates with AP 150 after providing the requisite authentication information. Alternatively, WiFi-enabled embedded device 120 (operating as a wireless station) may exchange probe request/probe response packets prior to association with the target AP (AP 150 in the example). Control then passes to step 299, in which the flowchart ends.

After associating with the target AP, WiFi-enabled embedded device 120 may exchange information/data packets with AP 150. By specifying appropriate values for configuration parameters, device 120 may be forced to operate with desired AP/WiFi network. In an embodiment, WiFi-enabled embedded device 120 is implemented with several capabilities to make the provisioning operations noted above more convenient, and requiring minimal or no user intervention, as described next.

4. Convenient Communication for Receiving Configuration Parameters

In an embodiment, when WiFi-enabled embedded device 120 boots up to operate as an access point (AP), the device sends beacons according to 802.11 standards. The beacons can be the basis on which wireless station 130 can associate with WiFi-enabled embedded device 120 (to establish layer-2 connectivity). Alternatively, probe requests can also be the basis for such connectivity.

WiFi-enabled embedded device 120 may be implemented with DHCP server software, thereby providing a layer-3 (Internet Protocol) address to wireless station 130 (if so requested by wireless station 130). WiFi-enabled embedded device 120 may be designed to choose an appropriate IP network address that does not conflict any pre-existing network (should one be operative at the time of deployment of WiFi-enabled embedded device 120). Once an IP address is allocated to both of WiFi-enabled embedded device 120 and wireless station 130 in a same IP network, the two devices are ready for communication using IP over wireless connection (802.11 standards). WiFi-enabled device 120 may also be implemented with SSL software to allow secure communication at layer-3.

mDNS/DNS-SD techniques may thereafter be used to enable automatic discovery, by wireless station 130, of the provisioning web application provided in WiFi-enabled embedded device 120. DNS-SD is specified by IETF draft "DNS-Based Service Discovery <draft-cheshire-dnsext-dns-sd-11.txt>" published on Dec. 9, 2011 by the Internet Engineering Task Force (IETF), and mDNS is specified in "Multicast DNS draft-cheshire-dnsext-multicastdns-15" published on Dec. 9, 2011 by the Internet Engineering Task Force (IETF).

For the operation of mDNS/DNS-SD based techniques, it is first assumed that the necessary layer-2 and layer 3 communication is established between device 120 (operating as an AP) and wireless station 130. Device 120 then advertises using a multi-cast destination IP address a provisioning service that the client devices (wireless stations) can interact with. Thus multi-cast packet is received by all wireless stations (though only one shown in FIG. 1) that have associated with device 120 as an AP. It is assumed that wireless station 130, is designed to process packets with such a multi-cast destination address, and station 130, operating as a resolver, discovers the provisioning service available on device 120. Alternatively, a broadcast address can be used, instead of multicast address, to facilitate discovery.

The service may be identified by a service URI, at which the service is accessible using HTTP type protocols. Thus, as a part of the discovery, WiFi-enabled embedded device 120 makes available the service URI to wireless station 130. Wireless station 130 accordingly needs to be implemented with compatible software to make use of the features provided at the service URI (in device 120) to at least provide values for various configuration parameters.

In a simple case, such compatible software is provided in the form of a web application made available on WiFi-enabled embedded device 120. This web application is downloaded using a URI (web application URI) that may also be made available automatically (during discovery) using the techniques described above. Wireless station 130 executes the downloaded web application, which facilitates a user to fill the fields (corresponding to respective configuration parameters) with appropriate values, and return the corresponding values to WiFi-enabled device 120. The web application communicates these user input fields to WiFi enabled device 120 using the service URI described above.

In another case, mobile applications (when wireless station 130 corresponds to a mobile device/phone) may use the service at the above mentioned service URI to transmit configuration parameters to the device 120 after interacting with the user. In yet another case, the configuration parameters may be transmitted to the device without any interaction with the user (machine to machine communications). For example, a module executing within wireless station 130 may identify the SSID (of access point 150) and authentication information required for interfacing with access point 150, and include the identified information as values of configuration parameters sent to device 120. The values may be sent using the APIs provided on device 120. Once properly configured with the received values, device 120 may operate as a wireless station in conjunction with AP 150, as described above.

Prior to, or as a part of step 220 described above, WiFi-enabled embedded device 120 may scan the 802.11-specified frequency channels to locate active (available) access points, while continuing to operate as an access point. WiFi-enabled embedded device 120 may thus compile a list of available APs, and communicate the list of APs to wireless station 130. Wireless station 130 can then specify the specific (according to techniques described above) one of the APs in the list as the target AP that WiFi-enabled embedded device 120 is to associate with. In this embodiment, WiFi-enabled embedded device 120 operates as an AP (to permit wireless station 120 to associate with it) and also scans channels for available access points. The scanning duration may be set long enough to find beacons from all available APs in the vicinity.

Thus, using the techniques of mDNS/DNS-SD, WiFi-enabled embedded device 120 can be provisioned with Wi-Fi capability, while requiring minimal (potentially zero) manual effort from a user.

Such minimal manual effort can be beneficial in several environments. For example, WiFi-enabled embedded device 120 may represent a 'smart' mains plug (main extension box). Such a mains plug is an embedded device with WiFi[™] capability, and may have a micro-controller for selectively switching-ON or switching-OF one or more mains power outlets provided in the plug. In addition, the mains plug may also have power-usage monitoring capability to monitor the amount of power consumed by devices (e.g., TVs, refrigerators) connected to the power outlets. The main plug may have minimal or no user interface.

After purchase of such a smart mains plug, a user may power the smart plug from a power outlet in his/her house. The user may wish the smart plug to communicate with an access point in the house, and via the access point to a computer for obtaining power use measurements, etc. The smart plug boots as an AP, and can communicate with, for example, the users mobile phone (with wireless station functionality). The mobile phone can send configuration parameters to the smart plug (now operating as an AP itself) as described above. After applying the configuration parameters, the smart plug operates as a wireless station to exchange data with the access point already installed in the house and thereby with the user's computer.

The convenient provisioning of above may be complemented with 'WPS Push Button' feature specified by the WiFi protected setup (WPS) in the IEEE 802.11 specifications. According to this feature, the provisioning web application in WiFi-enabled embedded device 120 causes a "soft button" to be displayed on a corresponding configuration web page viewed on wireless station 130. The user of wireless station 130 is prompted to 'push' the soft WPS button, which causes configuration of WiFi-enabled embedded device 120, as described above.

In yet another embodiment, the convenient provisioning of above is complemented by 'WPS PIN method' as specified by IEEE 802.11 specifications. According to this feature, the provisioning web application in WiFi-enabled embedded device 120 requests for the entry of a number (PIN or Personal Identification Number) on the corresponding configuration web page viewed on wireless station 130. Once the PIN is entered, the configuration of WiFi-enabled embedded device 120 is performed in a manner similar to that described in detail above.

After completion of initial configuration in accordance with the flowchart of FIG. 2, the WiFi enabled device can be put back into the provisioning mode by pressing a button or by sending a command over the network according to a pre-specified convention. In case of a button, the WPS button could be overloaded (for example, an extended push) to function as a button that also puts the device into provisioning mode.

It is noted that communication between WiFi-enabled embedded device 120 and wireless station (for example, as would be performed in step 220 of the flowchart of FIG. 2) can be protected by WPA (Wi-Fi Protected Access) or WPA2 (Wi-Fi Protected Access II) security protocols at layer 2, and SSL security at layer 3.

Also, the steps of 220 and 230 of the flowchart of FIG. 2 can be re-executed even after WiFi-enabled embedded device 120 has been provisioned once. For example, even after WiFi-enabled embedded device 120 has associated with AP 150 (based on execution of steps 210, 220 and 230 of the flowchart of FIG. 2), a user can cause steps 220 and 230 to be re-executed, with a different set of configuration parameters. As an example, a user can thus cause association of WiFi-enabled embedded device 120 with an AP (not shown in FIG. 1) other than AP 150. Such re-execution can be triggered by the use of an API as well.

The implementation details of WiFi-enabled embedded device 120 in an embodiment are described next.

5. WiFi-Enabled Embedded Device

Figure 3:
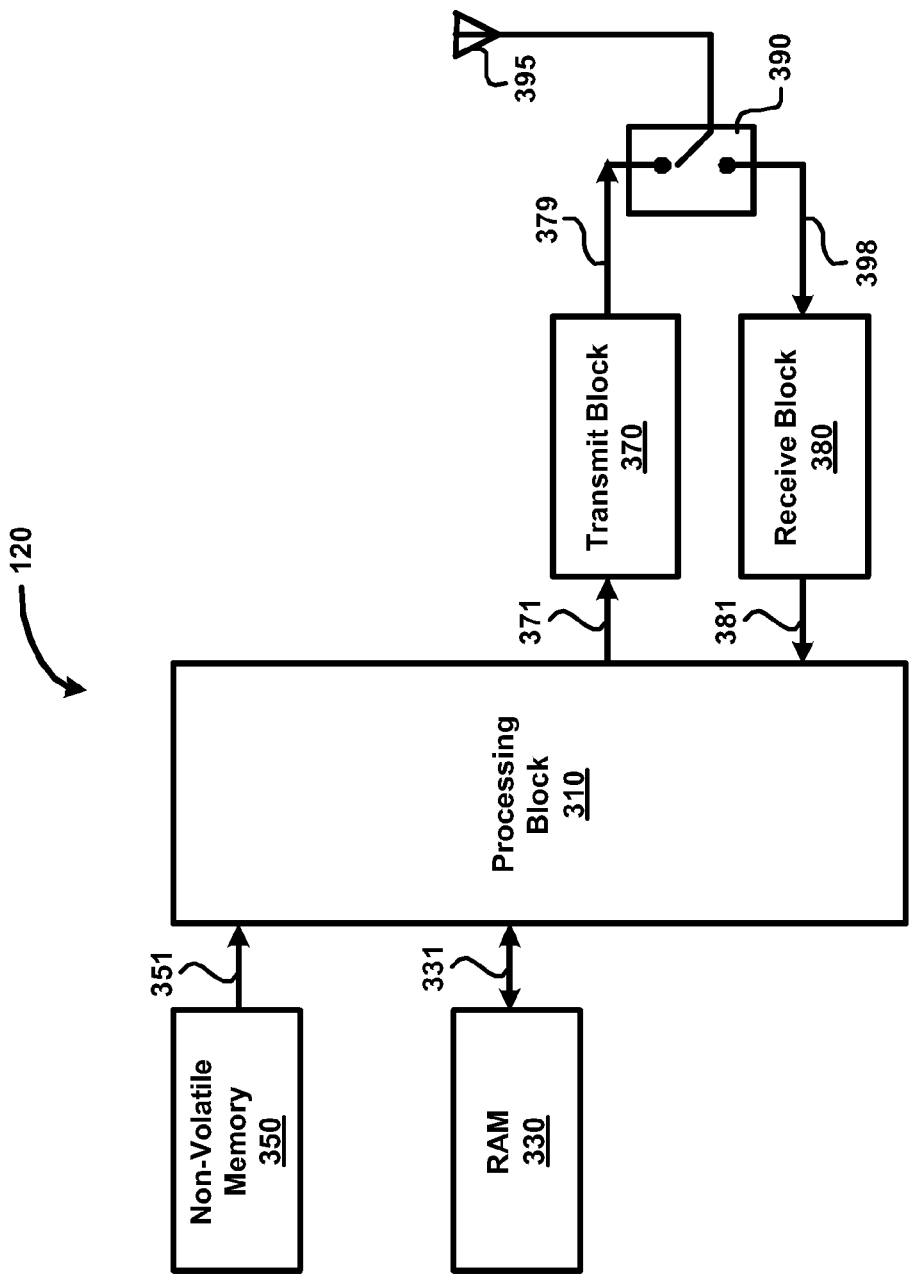
FIG. 3 is a block diagram illustrating the implementation details of a WiFi-enabled embedded device, in an embodiment of the present invention.

FIG. 3 is a block diagram illustrating the implementation details of a WiFi-enabled embedded device, in an embodiment of the present invention. WiFi-enabled embedded device 120 is shown containing processing block 310, volatile memory (RAM) 330, non-volatile memory 350, transmit block 370, receive block 380, switch 390 and antenna 395. The whole of WiFi-enabled embedded device 120 may be implemented as a system-on-chip (SoC). Alternatively, the blocks of FIG. 3 may be implemented on separate integrated circuits (IC).

The components/blocks of WiFi-enabled embedded device 120 are shown merely by way of illustration. However, device 120 may contain more or fewer components/blocks.

Antenna 395 operates to receive from, and transmit to, a wireless medium, corresponding wireless signals containing data. Switch 390 may be controlled by processing block 310 (connection not shown) to connect antenna 395 either to receive block 380 via path 398, or to transmit block 370 via path 379, depending on whether WiFi-enabled embedded device 120 is to receive or transmit. In another embodiment, the receive and transmit blocks are each connected to separate antennas to enable simultaneous reception and transmission.

Transmit block 370 receives data (to be transmitted via antenna 395) on path 371 from processing block 310, generates a modulated radio frequency (RF) signal according to IEEE 802.11 standards, and transmits the RF signal via switch 390 and antenna 395. Receive block 380 receives an RF signal (according to IEEE 802.11 standards) bearing data via switch 390 and antenna 395, demodulates the RF signal, and provides the extracted data to processing block 310 on path 381.

Non-volatile memory 350 stores instructions, which when executed by processing block enables WiFi-enabled embedded device 120 to be provisioned as described in detail above. Accordingly, non-volatile memory 350 may be viewed as a non-transitory machine/computer readable medium, which provides instructions that cause several features of the present invention to be operative. In the embodiments described above, such software instructions may include support for mDNS/DNS-SD, DNS server, DHCP server, HTTP, TCP/IP stacks (as described above), etc. Non-volatile memory 350 may in addition store web pages and other configuration data, both for the provisioning as well as the values received by communication with wireless station 130.

Volatile memory (RAM) 330 may be used to store data and temporary variables to be processed by processing block 310 in providing desired features. In particular, instructions and data representing the software modules and variables for enabling WiFi-enabled embedded device 120 to be provisioned as described above may be copied by processing block 310 from non-volatile memory 350 to RAM 330 for execution.

Volatile memory 330 and non-volatile memory 350 constitute computer program products or machine/computer readable medium, which are means for providing instructions to processing block 310. Processing block 310 may contain multiple processing units internally, with each processing unit potentially being designed for a specific task. Alternatively, processing block 310 may contain only a single general-purpose processing unit. The instructions executed by processing block 310 enable WiFi-enabled embedded device 120 to perform the steps of the flowchart of FIG. 2.

It should be appreciated that WiFi-enabled embedded device 120 may have additional mechanisms, which prevent the operation of the flowchart of FIG. 2, once the provisioning is complete. For example, non-volatile memory 350 may store 'configuration' flag, with a first value indicating that the device needs to be provisioned, and being set to another value once the provisioning is successful. Thus, the configuration flag is used to indicate whether WiFi-enabled embedded device 120 has received configuration parameters or not.

On subsequently powering-ON (after being powered OFF), WiFi-enabled embedded device 120 determines the value of the configuration flag to determine if the configuration parameters have already been received. If the configuration flag indicates that the configuration parameters have already been received, WiFi-enabled embedded device 120 does not perform the steps of the flowchart described above, and instead powers-ON as a wireless station directly and associates with the target AP for data exchange. Thus, the provisioning operations of the flowchart described above need be done potentially only once.

6. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of provisioning an embedded device with WiFi capability, said method comprising:
    booting as a first access point;
    communicating with a first wireless station to receive configuration parameters, wherein said embedded device continues to operate as said access point while receiving said configuration parameters; and
    applying said configuration parameters internally in said embedded device, to cause said embedded device to operate as a second wireless station.

2. The method of claim 1, wherein said WiFi capability, said communicating and said operation as said second wireless stations are all according to 802.11 standards,
    wherein said configuration parameters comprise a first parameter having an identifier of a second access point, wherein said embedded device establishes communication with said second access point, while operating as said second wireless station, in response to said first parameter having said identifier of said second access point.

3. The method of claim 2, wherein said communicating comprises:
    participating in a discovery mechanism to provide a service Uniform Resource Identifier (URI) to said first wireless station, wherein said first wireless station executes a web application to interface with services accessible at said service URI, said web application being operable to provide said configuration parameters to said embedded device.

4. The method of claim 3, wherein an Application Programming Interface (API) is provided at said service URI corresponding to routines stored in said embedded device, and said embedded device receives invocations of routine using said API to receive said configuration parameters.

5. The method of claim 3, wherein said web application is identified by an application URI, which is also provided by said embedded device during said discovery mechanism, data representing said web application being stored in said embedded device, said method further comprising:
receiving a request from said wireless station for said web application identified by said web application URI;
sending data representing said web application to said wireless station in response to said request,
wherein said web application, upon execution in said wireless station, sends said configuration parameters to said embedded device.

6. The method of claim 5, further comprising:
scanning for frequencies consistent with 802.11 standards to identify a set of access points present in vicinity;
sending a list representing said set of access points to said wireless station;
receiving an identifier of a first wireless station from said list as said first parameter.

7. The method of claim 5, wherein said discovery mechanism is based on mDNS/DNS-sd.

8. The method of claim 5, wherein said communicating is based on Hypertext Transfer Protocol (HTTP) accessing the provisioning service as a resource at said URI to receive said configuration parameters.

9. The method of claim 1, wherein said communicating encrypted according to WPA/WPA2 security protocols at layer 2, and according to SSL security at layer 3.

10. The method of claim 1, wherein said communicating and said applying are re-executed at a time subsequent to a time of said booting.

11. The method of claim 1, wherein said communicating and said applying are triggered on pushing, by a user of said Wi-Fi device, of the WPS button that has been overloaded.

12. A non-transitory machine readable medium storing one or more sequences of instructions in an embedded device with WiFi capability according to 802.11 standards, wherein execution of said one or more sequences of instructions by one or more processors contained in said embedded device causes said embedded device to perform the actions of:
booting as a first access point according to said 802.11 standards;
associating with a first wireless station according to said 802.11 standards;
communicating with said first wireless station to receive configuration parameters, wherein said embedded device continues to operate as said access point while receiving said configuration parameters; and
applying said configuration parameters internally in said embedded device, to cause said embedded device to thereafter operate as a second wireless station.

13. The non-transitory machine readable medium of claim 12, wherein said configuration parameters comprise a first parameter having an identifier of a second access point, wherein said embedded device establishes communication with said second access point, while operating as said second wireless station, in response to said first parameter having said identifier of said second access point.

14. The non-transitory machine readable medium of claim 13, wherein said communicating comprises:
participating in a discovery mechanism to provide a service Uniform Resource Identifier (URI) to said first wireless station,
wherein said first wireless station executes a web application to interface with services accessible at said service URI, said web application being operable to provide said configuration parameters to said embedded device.

15. The non-transitory machine readable medium of claim 14, wherein an Application Programming Interface (API) is provided at said service URI corresponding to routines stored in said embedded device, and said embedded device receives invocations of routine using said API to receive said configuration parameters.

16. The non-transitory machine readable medium of claim 15, wherein said web application is identified by an application URI, which is also provided by said embedded device during said discovery mechanism, data representing said web application being stored in said embedded device, further comprising:
receiving a request from said wireless station for said web application identified by said web application URI;
sending data representing said web application to said wireless station in response to said request,
wherein said web application, upon execution in said wireless station, sends said configuration parameters to said embedded device.

17. The non-transitory machine readable medium of claim 14, wherein said discovery mechanism is based on mDNS/DNS-sd.

18. An embedded device with WiFi capability comprising:
a memory to store instructions;
a processor to retrieve instructions from said memory and to execute said instructions, wherein execution of said retrieved instructions causes said embedded device to perform the actions of:
booting as a first access point;
communicating with a first wireless station to receive configuration parameters, wherein said embedded device continues to operate as said access point while receiving said configuration parameters; and
applying said configuration parameters internally in said embedded device, to cause said embedded device to operate as a second wireless station.

19. The embedded device of claim 18, wherein said WiFi capability, said communicating and said operation as said second wireless stations are all according to 802.11 standards,
wherein said configuration parameters comprise a first parameter having an identifier of a second access point, wherein said embedded device establishes communication with said second access point, while operating as said second wireless station, in response to said first parameter having said identifier of said second access point.

20. The embedded device of claim 19, wherein said communicating comprises:
participating in a discovery mechanism to provide a service Uniform Resource Identifier (URI) to said first wireless station,
wherein said first wireless station executes a web application to interface with services accessible at said service URI, said web application being operable to provide said configuration parameters to said embedded device.

* * * * *